United States Patent
Bertenburg et al.

(12) 
(10) Patent No.: US 6,768,065 B2
(45) Date of Patent: Jul. 27, 2004

(54) SENSOR DEVICE FOR A VEHICLE SEAT

(75) Inventors: Peter Bertenburg, Elchingen (DE); Horst Kespohl, Weilhein/Teck (DE)

(73) Assignee: RECARO GmbH & Co., KG, Kirchheim/Teck (DE)

( * ) Notice: Subject to any disclaimer, the term of this patent is extended or adjusted under 35 U.S.C. 154(b) by 115 days.

(21) Appl. No.: 10/213,680

(22) Filed: Aug. 6, 2002

(65) Prior Publication Data

US 2003/0030563 A1 Feb. 13, 2003

(30) Foreign Application Priority Data

Aug. 7, 2001 (DE) .......................................... 101 38 676

(51) Int. Cl.[7] .......................... G01L 1/22; B60R 21/32; G01G 21/02; G01G 19/12
(52) U.S. Cl. .................... 177/144; 180/273; 73/862; 73/635; 73/642; 73/768; 280/735
(58) Field of Search ................ 180/273; 280/735; 177/136, 144; 701/45; 73/862.043, 862.044, 862.045, 767, 768, 862.631, 862.642, 862.635

(56) References Cited

U.S. PATENT DOCUMENTS

| | | | | |
|---|---|---|---|---|
| 2,493,029 A | * | 1/1950 | Ramberg | 338/5 |
| 3,481,192 A | | 12/1969 | Herzog et al. | 73/862.045 |
| 3,513,431 A | * | 5/1970 | Sandor | 338/5 |
| 3,541,844 A | * | 11/1970 | Stover | 73/761 |
| 3,559,474 A | * | 2/1971 | Gurol | 73/862.635 |
| 3,841,192 A | * | 10/1974 | Leonard | 84/485 R |
| 4,203,319 A | * | 5/1980 | Lechler | 73/862.541 |
| 4,280,363 A | * | 7/1981 | Johansson | 73/768 |
| 4,478,091 A | * | 10/1984 | Forrester | 73/862.541 |
| 4,738,140 A | * | 4/1988 | Kempf | 73/730 |
| 4,911,024 A | * | 3/1990 | McMaster | 73/862.045 |
| 4,932,253 A | * | 6/1990 | McCoy | 73/152.61 |
| 5,714,695 A | * | 2/1998 | Bruns | 73/862.641 |
| 5,837,946 A | * | 11/1998 | Johnson et al. | 177/136 |
| 5,991,676 A | * | 11/1999 | Podoloff et al. | 701/45 |
| 6,104,100 A | * | 8/2000 | Neuman | 307/10.1 |
| 6,595,570 B2 | * | 7/2003 | Susko | 296/68.1 |

FOREIGN PATENT DOCUMENTS

| | | |
|---|---|---|
| DE | 94 16 933.0 U1 | 1/1995 |
| DE | 199 83 715 T1 | 3/2000 |
| DE | 198 47 603 A1 | 4/2000 |
| WO | WO 00/29257 A2 | 5/2000 |

* cited by examiner

*Primary Examiner*—Randy W. Gibson
(74) *Attorney, Agent, or Firm*—Alston & Bird LLP

(57) ABSTRACT

A sensor device (11) for a vehicle seat, in particular a motor vehicle seat, has at least one sensor (15) for the detection of forces inside the vehicle seat. The vehicle seat has at least one bearing area between two components that are mobile relative to one another, and the sensor device (11) is installed in the bearing area.

20 Claims, 1 Drawing Sheet

SENSOR DEVICE FOR A VEHICLE SEAT

BACKGROUND OF THE INVENTION

The present invention relates to a sensor device for a vehicle seat, with the sensor being for detecting forces inside the vehicle seat.

A known sensor device of this type serves to determine the seat load by measuring the total weight of the vehicle seat. This data, for example, can trigger the inflation of the airbag. Problems may occur in distinguishing between light adults and heavy children in child seats. The sensor device is installed, for example, as a large-surface component between the seat underframe and the floor group.

BRIEF SUMMARY OF THE INVENTION

One aspect of the present invention is the provision of improvements to a sensor device for a vehicle seat. In accordance with this aspect, a bearing area is positioned between two components of the vehicle seat so that there can be relative movement between the two components, and a sensor device, which includes at least one sensor, is installed in the bearing area for detecting forces inside the vehicle seat.

By installing the sensor device in the bearing area, i.e. in the direct force flow between the part of the vehicle seat above the bearing area and the part of the vehicle seat and the vehicle frame below the bearing area, it is possible to measure bearing forces occurring at this point which will allow conclusions to be drawn with respect to the seat load at this point. Electrical signals of the sensor or sensors can be evaluated and used for compensating measures or the activation of safety components such as airbags. The arrangement, preferably as a socket between the two components which are moveable relative to one another, can be easily mounted directly in the bearing area; because of its small dimensions it does not take up much space. It can be integrated into existing bearing areas, e.g. in articulated height adjusters, by slightly modifying the bearing areas. No additional adapters are required, for example, between the height adjuster and the connection with the vehicle floor group. Through the installation in at least three, and preferably four, bearing areas located approximately on an horizontal level, the position of the occupant can be determined.

The bearing forces, i.e. their size and direction or components, can be precisely determined with a minimum of three sensors in the direction of the circumference. By distinguishing the direction of the forces, it will be possible to distinguish between exclusive weight forces and horizontal force components. Reaction forces which might be produced by the lever mechanisms of a height adjuster and/or inclination adjuster are filtered out. For this purpose, the sensors are installed preferably inside the socket or in the gaps between different bearing elements of the socket which are installed one inside the other. It will be possible to determine pivoting moments by means of additional sensors in the axial direction of the socket.

Preferably, the outer contour of the socket has a single deviation, i.e. an asymmetry, from an otherwise regular form, e.g. a tongue or indentation. In this case, the receiving part of the bearing area preferably has a corresponding asymmetry so that when the socket is mounted it may be given a defined alignment for calibration.

BRIEF DESCRIPTION OF THE SEVERAL VIEWS OF THE DRAWINGS

The invention is explained in greater detail below with reference to four exemplary embodiments which are illustrated in the drawings, wherein.

DETAILED DESCRIPTION OF THE INVENTION

Figure 1:
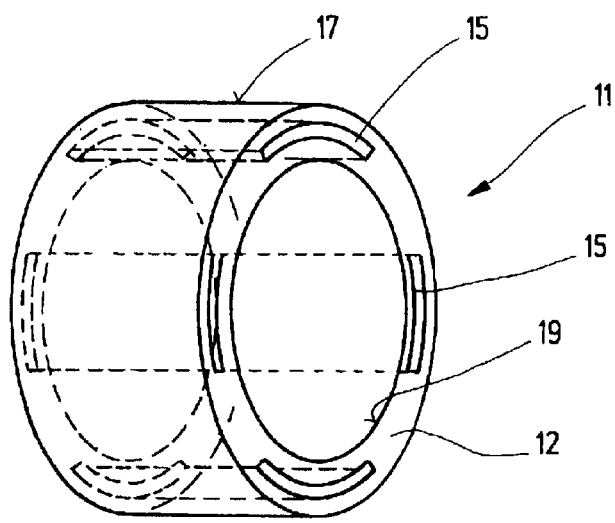
FIG. 1 a perspective view of the first exemplary embodiment.
Figure 4:
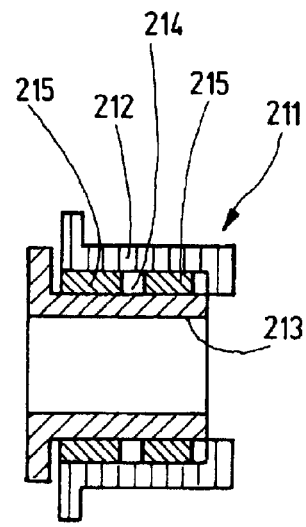
Figure 2:
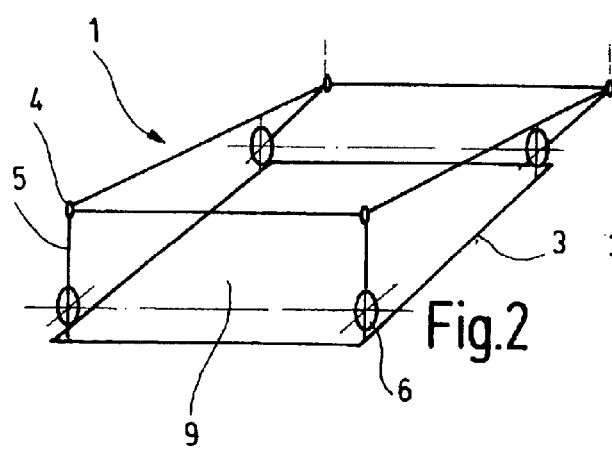
FIG. 2 a perspective, schematic representation of the structure of a vehicle seat underframe, FIG. 3 a transversal section through the second exemplary embodiment, FIG. 4 a longitudinal section through the third exemplary embodiment, and FIG. 5 a longitudinal section through the fourth exemplary embodiment.
Figure 5:
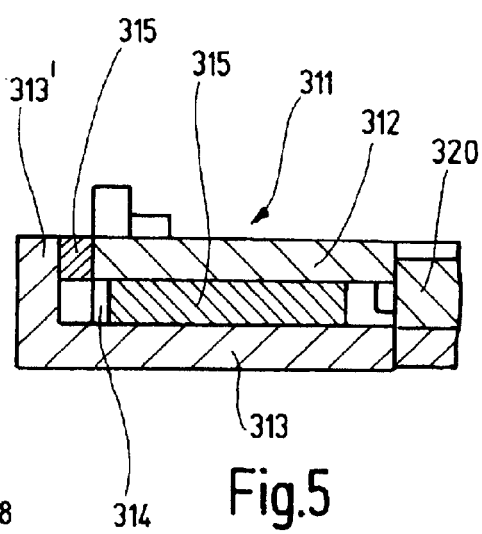
Figure 3:
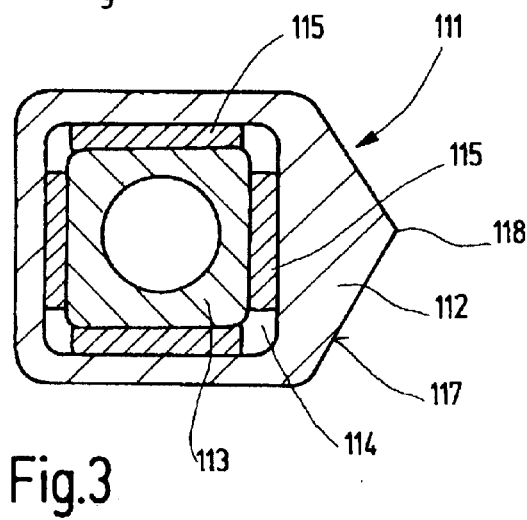

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements.

A vehicle seat 1 has a height-adjustable seat underframe 3 with a quadruple articulation on each side of the vehicle seat. Each of the four upper bearing areas 4 is articulately connected with one of the four lower bearing areas 6 of the seat underframe 3 by means of a side component 5, which can be characterized as a wing. The side components 5 are thus mobile relative to a structure-fixed floor area 9 (e.g., component) of the seat underframe 3.

In the first exemplary embodiment, a sensor socket 11 is installed in each of the lower bearing areas 6. The sensor socket 11 has a hollow cylindrical bearing housing 12 made of bearing material. At least three, and preferably four, sensors 15 are embedded in the wall of the bearing housing 12 in the circumferential direction, and staggered by 90°. The outer contour 17 of the sensor socket 11, for example, is firmly mounted to the floor area 9, whereas the inner contour 19 of the sensor socket 11 receives a bearing bolt of the side component 5.

Depending on the bearing forces acting on the lower bearing areas 6 via the side components 5, i.e. the forces' magnitude and direction, the sensors 15 which are sensitive in a radial direction (radial sensors) emit electrical signals, e.g. changes in resistance, capacity, or voltage, from which any occurring bearing forces can be determined and their magnitude and direction calculated. These parameters change depending on varying weight distributions on the seat and through pivoting movements of the side components 5 when the height adjuster is used. Horizontal force components can thereby be eliminated and the exclusive weight forces measured. Sensors 15 can be extensible catcher foils, pressure-sensitive piezo elements or other force sensors.

In the second exemplary embodiment, which is largely identical to the first exemplary embodiment and in which the identical components or components with identical effects thus have their reference signs increased by 100, a sensor socket 111 is installed in each of the lower bearing areas. The sensor socket 111 has a bearing housing 112 and an inner bearing core 113 located inside the outer bearing housing 112. The two bearing elements 112 and 113 are extrusion profiles made from one single bearing material. The inner contour of the outer bearing housing 112 and the outer contour of the inner bearing core 113 are in the shape of a square, thus forming four gaps 114 running vertically in relation to one another, with one of the sensors 115 of the aforementioned type installed in each of them as a radial sensor. The force then flows through the sensor socket 111 in a radial direction exclusively via the sensors 115.

On one side of the square, the outer contour 117 has a lug 118 fitting into a corresponding indentation in the receptor hole in the floor area. With this particular shape, which is asymmetrical in the direction of the circumference, a clearly defined position is ensured when installing the sensor socket 111. This way, faulty installation is avoided, which is important for calibrating the sensors 115. The functioning mode of the sensors 115 is identical to that in the first exemplary embodiment.

In the third exemplary embodiment, because of its being largely identical to the second, identical or identically functioning components have been given reference signs increased by another 100. In each of the lower bearing areas there is a sensor socket 211 which has an outer bearing housing 212 and an inner bearing core 213 inserted into the latter in an axial direction and thereby forming four gaps 214. In contrast to the previous exemplary embodiment, there are two sensors 215 installed, one behind the other, in an axial direction in each of the four gaps 214. The individual sensors 215, having the function of radial sensors identical to that of the sensors in the previous exemplary embodiment, can thus detect and monitor pivoting moments.

In the fourth exemplary embodiment, again because of its being largely identical to the second exemplary embodiment, identical or identically functioning components have been given reference signs increased by 200. In each of the lower bearing areas there is a sensor socket 311 which has an outer bearing housing 312 and inner bearing core 313 inserted into the latter in an axial direction and thereby forming four gaps 314. As in the second exemplary embodiment, there is one sensor 315 installed as a radial sensor in each of the four gaps 314. In addition, another sensor 315 is installed as an axial sensor between a radial flange 313' of the inner bearing core 313 and a frontal side of the outer bearing housing 312. Again, the function of the sensors 315 is identical to that of the sensors in the previous exemplary embodiment. A rotary lock 320, e.g. with serrated indentation, is installed between the two bearing elements 312 and 313 at that end of the sensor socket 311 which is opposite from the flange 313'.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A sensing system for a vehicle seat, comprising:
    at least two components of the vehicle seat, wherein the two components are mounted so that a bearing area is positioned between the two components, so that there can be relative movement between the two components by way of the bearing area; and
    a sensor device is installed in the bearing area and includes at least one sensor for detecting forces inside the vehicle seat,
    wherein the sensor device comprises a socket that is mounted in the bearing area between the two components, the socket defines a circumferential direction, the sensor device includes a plurality of sensors, and at least three of the sensors are mounted in the circumferential direction of the socket, and wherein the sensors are positioned either:
    inside a bearing element of the socket, or
    between two bearing elements of the socket, with said two bearing elements being positioned one inside the other.

2. A sensing system according to claim 1, wherein the bearing area is one of four lower bearing areas of a seat underframe of the vehicle seat, and the sensor device is one of a plurality of sensor devices that are arranged so that for each of the lower bearing areas, one of the sensor devices is installed in the lower bearing area, whereby the sensor devices are respectively installed at the lower bearing areas, and wherein the seat underframe is operative so that at least one of a height and an inclination of the seat underframe can be adjusted.

3. A sensing system according to claim 1, wherein the socket defines an axial direction that is at least generally perpendicular to the circumferential direction, and at least two of the sensors are in the socket and arranged in the axial direction.

4. A sensing system according to claim 3, wherein:
    at least one of the sensors is operative for emitting electrical signals in response to sensing forces that are directed radially with respect to the axial direction and, and
    at least one of the sensors is operative for emitting electrical signals in response to sensing forces that are directed in the axial direction.

5. A sensing system according to claim 3, wherein at least one of the sensors is an axial sensor that is operative for emitting electrical signals in response to sensing forces that are directed in the axial direction, and the axial sensor is positioned between a flange and a part that are respectively parts of said two bearing elements that are positioned one inside the other.

6. A sensing system according to claim 1, wherein the socket has an outer contour which is asymmetrical in the circumferential direction.

7. A sensing system according to claim 3, wherein the socket has an outer contour which is asymmetrical in the circumferential direction.

8. A sensing system according to claim 4, wherein the socket has an outer contour which is asymmetrical in the circumferential direction.

9. A sensing system according to claim 5, wherein the socket has an outer contour which is asymmetrical in the circumferential direction.

10. A sensing system for a vehicle seat, comprising:
    at least two components of the vehicle seat, wherein the two components are mounted so that a bearing area is positioned between the two components, so that there can be relative movement between the two components by way of the bearing area; and
    a sensor device is installed in the bearing area and includes at least one sensor for detecting forces inside the vehicle seat,
    wherein the sensor device comprises a socket that is mounted in the bearing area between the two components, and
    wherein the socket defines a circumferential direction, and the socket has an outer contour which is asymmetrical in the circumferential direction.

11. A sensing system according to claim 10, wherein the bearing area is one of four lower bearing areas of a seat underframe of the vehicle seat, and the sensor device is one of a plurality of sensor devices that are arranged so that for each of the lower bearing areas, one of the sensor devices is installed in the lower bearing area, whereby the sensor devices are respectively installed at the lower bearing areas, and wherein the seat underframe is operative so that at least one of a height and an inclination of the seat underframe can be adjusted.

12. A sensing system according to claim 3, wherein the bearing area is one of four lower bearing areas of a seat underframe of the vehicle seat, and the sensor device is one of a plurality of sensor devices that are arranged so that for each of the lower bearing areas, one of the sensor devices is installed in the lower bearing area, whereby the sensor devices are respectively installed at the lower bearing areas, and wherein the seat underframe is operative so that at least one of a height and an inclination of the seat underframe can be adjusted.

13. A sensing system according to claim 4, wherein the bearing area is one of four lower bearing areas of a seat underframe of the vehicle seat, and the sensor device is one of a plurality of sensor devices that are arranged so that for each of the lower bearing areas, one of the sensor devices is installed in the lower bearing area, whereby the sensor devices are respectively installed at the lower bearing areas, and wherein the seat underframe is operative so that at least one of a height and an inclination of the seat underframe can be adjusted.

14. A sensing system according to claim 5, wherein the bearing area is one of four lower bearing areas of a seat underframe of the vehicle seat, and the sensor device is one of a plurality of sensor devices that are arranged so that for each of the lower bearing areas, one of the sensor devices is installed in the lower bearing area, whereby the sensor devices are respectively installed at the lower bearing areas, and wherein the seat underframe is operative so that at least one of a height and an inclination of the seat underframe can be adjusted.

15. A sensing system for a vehicle seat, comprising:
a sensor socket that includes at least one bearing element and is mounted between two components of the vehicle seat for allowing relative movement between the two components, wherein the sensor socket defines a circumferential direction, the sensor socket includes a plurality of sensors for detecting forces inside the vehicle seat, at least three of the sensors are mounted in the circumferential direction of the socket, and the three sensors are positioned inside the bearing element of the socket.

16. A sensing system for a vehicle seat, comprising:
a sensor socket that includes at least one bearing element and is mounted between two components of the vehicle seat for allowing relative movement between the two components, wherein the bearing element is a first bearing element, the sensor socket further includes a second bearing element positioned inside the first bearing element, the sensor socket defines a circumferential direction, the sensor socket includes a plurality of sensors for detecting forces inside the vehicle seat, at least three of the sensors are mounted in the circumferential direction of the socket, and the three sensors are positioned between the first and second bearing elements.

17. A sensing system according to claim 15, wherein the socket has an outer contour which is asymmetrical in the circumferential direction.

18. A sensing system according to claim 15, wherein the socket defines an axial direction that is at least generally perpendicular to the circumferential direction, and at least two of the sensors are arranged in the axial direction.

19. A sensing system according to claim 16, wherein the socket has an outer contour which is asymmetrical in the circumferential direction.

20. A sensing system according to claim 16, wherein the socket defines an axial direction that is at least generally perpendicular to the circumferential direction, and at least two of the sensors are arranged in the axial direction.

* * * * *